(No Model.)

J. VETTERLEIN.
WHEEL FOR CYCLES.

No. 476,433. Patented June 7, 1892.

Witnesses:
J. Staib
Chas H. Smith

Inventor:
John Vetterlein
per Lemuel W. Serrell
Atty

United States Patent Office.

JOHN VETTERLEIN, OF NORTH PLAINFIELD, NEW JERSEY.

WHEEL FOR CYCLES.

SPECIFICATION forming part of Letters Patent No. 476,433, dated June 7, 1892.

Application filed February 15, 1892. Serial No. 421,502. (No model.)

*To all whom it may concern:*

Be it known that I, JOHN VETTERLEIN, a citizen of the United States, residing at North Plainfield, in the county of Somerset and State of New Jersey, have invented an Improvement in Wheels for Cycles, of which the following is a specification.

In wheels for bicycles and tricycles each spoke has in some instances been screw-threaded near the end and received into a nipple passing through the felly and having a conical flange entering the countersink of the felly. In this instance if a spoke breaks it is almost impossible to get the screw-threaded end out of the nipple without loosening the rubber tire and removing the nipple, because the parts are often rusted together or the screw-threaded spoke breaks off in the nipple where there is no opportunity to grasp the same and unscrew it. In other instances a sleeve screw-threaded on the outside has been fastened to the spoke and screwed into a nipple passing through the felly; but in this construction there is difficulty in setting up or tightening the spoke if the same becomes loose, and in screwing up the parts the spoke is liable to become twisted and injured by the torsion or to become loose in use, and in case of the spoke becoming injured it is difficult to replace the same.

The present invention is specially adapted to spokes in which the end thereof is screw-threaded and in which the adjustment of the spoke may be varied according to circumstances, and in case the spoke becomes too long or where a new spoke has to be introduced in place of an injured one the screw-thread upon the spoke can be cut along the same to any desired extent and the spoke can be taken out without disturbing the thimble or without disturbing the rubber tire around the wheel.

Figure 1:
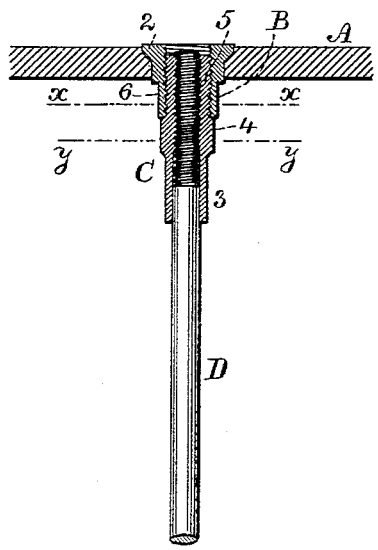
Figure 4:
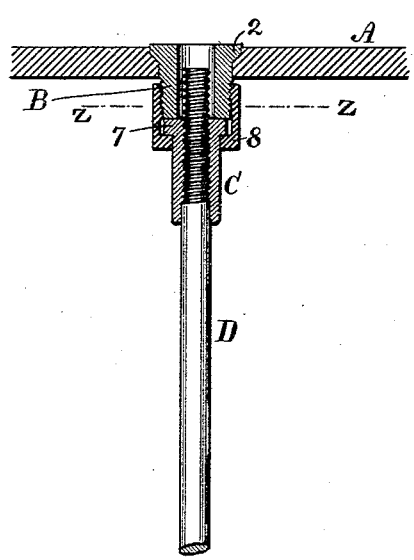
Figure 2:
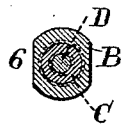
Figure 5:
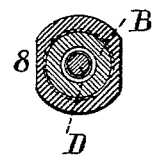
Figure 3:
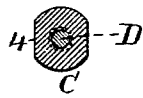

In the drawings, Figure 1 is a cross-section in magnified size representing a part of the felly, the nipple, and the sleeve; and Fig. 2 is a section at $x$ $x$ and Fig. 3 a section at $y$ $y$, Fig. 1. Fig. 4 is a sectional view of a modification in the thimble; and Fig. 5 is a section at $z$ $z$, Fig. 4.

The felly A is to be of any desired character, and the nipple B passes through the same, having a flange or conical head 2 on the outer side of the felly, against which the strain of the spoke acts, and the spoke D is received into the tubular sleeve C, and such sleeve is made with a cylinder 3, fitting tightly the unscrewed portion of the spoke, so as to sustain the same against any lateral strain, in order that the spoke may not break off at the end of the screw-threaded portion, and this sleeve C is toward its outer end made as a nut to fit the screw-thread of the spoke, and there is a collar 4 around the sleeve, which is flattened at one or more of its sides, so as to be adapted to a wrench, by which such sleeve can be either rotated or held firmly, and the sleeve is screw-threaded at 5 to screw into the nipple B, and the nipple B projects through the felly A, and it is flattened at 6 for a wrench, by which it may be rotated or held firmly.

In introducing the parts it is advantageous to apply nipples B at the holes in the felly and to screw the sleeves C upon the spokes D up to the proper places, and then to enter the end of the sleeves C into the nipples B and hold the sleeves C stationary while the nipples B are being rotated to screw the sleeves into the nipples, and in so doing the strain is applied to the spokes without any twisting action upon the spokes themselves, and it is advantageous to screw the nipples upon the sleeves until the collars 4 are firmly clamped by the end of such nipples. If a spoke is injured or if it has to be adjusted, the sleeve C can be held firmly while the nipple B is rotated to loosen up the spoke, and the sleeve C can then be revolved upon the spoke to the desired extent, and then the sleeve C is held firmly while the nipple B is rotated to apply strain upon the spoke. If the spoke is broken, the sleeve C can be unscrewed from the nipple B with facility and the sleeve can be fitted upon another spoke, and if the spoke is too long the screw-thread can be cut upon the same to the desired extent for the reception of the sleeve, and then the strain can be applied to the spoke by holding the sleeve while the nipple is rotated to screw it upon the end of the sleeve. By this means a facility is given in the construction of the suspension-wheel or in repairs for the same which is not possessed in the wheels heretofore constructed. If desired, the screw-thread may be on the outside of the nipple instead of the inside, in which case a flange 7 is to be provided on the sleeve and a union 8 to act against the flange 7, and to screw upon the outside of the nipple, the parts acting in the manner before described.

I claim as my invention—

1. The combination, with the felly, of a nipple passing through the felly and having a flange against the exterior of the felly, a spoke screw-threaded near the end, a sleeve forming a nut screwed upon the spoke and having a collar by which the sleeve can be held or rotated, a screw-threaded exterior near one end to screw to the nipple, and a cylindrical portion at the other end into which the wire of the spoke passes, substantially as set forth.

2. The combination, with the screw-threaded spoke, of a sleeve forming a nut screwed upon the spoke, a nipple passing through the felly and having a flange against the exterior of the felly, and a screw connection between the sleeve and the nipple, substantially as set forth.

Signed by me this 11th day of February, 1892.

JOHN VETTERLEIN.

Witnesses:
GEO. T. PINCKNEY,
HAROLD SERRELL.